(12) United States Patent
Bampton

(10) Patent No.: US 7,540,996 B2
(45) Date of Patent: Jun. 2, 2009

(54) LASER SINTERED TITANIUM ALLOY AND DIRECT METAL FABRICATION METHOD OF MAKING THE SAME

(75) Inventor: Clifford C. Bampton, Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 110 days.

(21) Appl. No.: 10/718,961

(22) Filed: Nov. 21, 2003

(65) Prior Publication Data

US 2005/0112015 A1    May 26, 2005

(51) Int. Cl.
*B22F 3/105* (2006.01)
*C22C 14/00* (2006.01)

(52) U.S. Cl. .............................. 419/53; 419/54; 419/55

(58) Field of Classification Search .................. 419/52, 419/5; 75/255
See application file for complete search history.

(56) References Cited

U.S. PATENT DOCUMENTS

| | | | | | |
|---|---|---|---|---|---|
| 3,950,166 | A | * | 4/1976 | Obara et al. .................. | 419/33 |
| 3,963,485 | A | * | 6/1976 | Thellmann .................... | 419/35 |
| 4,331,477 | A | * | 5/1982 | Kubo et al. ................... | 75/228 |
| 4,534,808 | A | * | 8/1985 | Eylon et al. ................... | 75/245 |
| 4,719,077 | A | * | 1/1988 | Suzuki et al. ................. | 419/23 |
| 4,725,509 | A | * | 2/1988 | Ryan .......................... | 428/607 |
| 5,064,463 | A | * | 11/1991 | Ciomek ........................ | 75/314 |
| 5,156,697 | A | * | 10/1992 | Bourell et al. ................ | 264/497 |
| 5,182,170 | A | * | 1/1993 | Marcus et al. ............... | 264/497 |
| 5,207,371 | A | * | 5/1993 | Prinz et al. .................... | 228/125 |
| 5,211,776 | A | * | 5/1993 | Weiman ....................... | 148/525 |
| 5,248,475 | A | * | 9/1993 | Feldstein ...................... | 419/35 |
| 5,322,666 | A | * | 6/1994 | Watwe ......................... | 419/32 |

(Continued)

FOREIGN PATENT DOCUMENTS

GB              2190100 A   * 11/1987

(Continued)

OTHER PUBLICATIONS

Abbott et al., AeroMet implementing novel Ti process, Metal Powder Report (MPR), vol. 53, issue 2, Feb. 1998, pp. 24-26.*

(Continued)

*Primary Examiner*—Roy King
*Assistant Examiner*—Tima M McGuthry-Banks
(74) *Attorney, Agent, or Firm*—Yee & Associates, P.C.; James M. Poole

(57) ABSTRACT

Methods and powder blends are provided for fabricating a metal part. One method includes the first steps of spreading a layer of a powder blend on a platform, the powder blend including a titanium base metal or alloy, and an alloying metal having a lower melting temperature than that of the base metal or alloy. Next, an energy beam is directed onto selected areas of the powder blend layer to thereby melt the alloying metal. Then, the alloying metal is re-solidified by withdrawing the energy beam from the powder blend layer. Then, a preform part is built up by iteratively performing the spreading, melting, and re-solidifying steps on additional adjacently formed layers. A metal liquid phase sintering process is performed at a temperature sufficient to melt the alloying metal but not the base metal or alloy.

22 Claims, 1 Drawing Sheet

U.S. PATENT DOCUMENTS

| | | | | |
|---|---|---|---|---|
| 5,366,570 | A | * | 11/1994 | Mazur et al. ............... 148/669 |
| 5,431,967 | A | * | 7/1995 | Manthiram et al. .......... 427/555 |
| 5,640,667 | A | * | 6/1997 | Freitag et al. ................. 419/31 |
| 5,732,323 | A | * | 3/1998 | Nyrhila .......................... 419/2 |
| 5,745,834 | A | * | 4/1998 | Bampton et al. |
| 5,792,289 | A | * | 8/1998 | Morton et al. ............... 148/421 |
| 5,893,404 | A | * | 4/1999 | Mendez et al. .............. 164/71.1 |
| 5,980,812 | A | * | 11/1999 | Lawton ....................... 264/401 |
| 6,042,780 | A | * | 3/2000 | Huang .......................... 419/36 |
| 6,048,954 | A | * | 4/2000 | Barlow et al. ............. 526/328.5 |
| 6,223,976 | B1 | * | 5/2001 | Clement et al. .......... 228/248.5 |
| 6,450,393 | B1 | * | 9/2002 | Doumanidis et al. ..... 228/110.1 |
| 6,656,410 | B2 | * | 12/2003 | Hull et al. ................... 264/401 |
| 6,719,948 | B2 | * | 4/2004 | Lorenz et al. ................. 419/27 |
| 6,730,998 | B1 | * | 5/2004 | Williams et al. ............ 257/712 |
| 6,814,926 | B2 | * | 11/2004 | Geving et al. .................. 419/5 |
| 2002/0195746 | A1 | * | 12/2002 | Hull et al. ................... 264/401 |
| 2003/0010409 | A1 | * | 1/2003 | Kunze et al. ................ 148/513 |
| 2003/0074096 | A1 | * | 4/2003 | Das et al. .................... 700/119 |

FOREIGN PATENT DOCUMENTS

| | | | | |
|---|---|---|---|---|
| JP | 50051011 | A | * | 5/1975 |
| JP | 62177137 | A | * | 8/1987 |
| JP | 06-272012 | | * | 9/1994 |

OTHER PUBLICATIONS

Blue et al., Infrared Transient-Liquid-Phase Joining of SCS-6B21S Titanium Matrix Composite, Metallurgical and Materials Transactions A, vol. 27A, Dec. 1996, 4011-4018.*

Zhuang et al., Transient Liqud-Phase Bonding Using Coated Metal Powders, Welding REsearch Supplement. Apr. 1997, pp. 157-s-162-s.*

Moffatt's handbook of Binary Phase Diagrams, Nov. 5, 1995, Cu-Ti, Al-Ti, Sn, Ti-V, Ni-Ti.*

Machine Translation of JP 62-272012, published Sep. 27, 1994.*

Das et al., Processing of titanium new shapes by SLS HIP, Materials & Design 20 (1999) 115-121, pp. 115-121.*

Rongti et al., Thermodynamic Properties of Ti in Ag-Cu-Ti alloys, Materials Science and Engineering A335 (2002) 21-25.*

ASM Metals Reference Book, third edition, ASM International, 1993, p. 505.*

Physical Metallurgy Principles, third edition, Reed-Hill et al., PWS Publishing Company, 1994, pp. 710 and 714-718.*

Metals Handbook, Desk Edition, 2$^{nd}$ Edition, ASM International, 1998, p. 5.*

CRC Handbook of Chemistry and Physics, 69th edition. 1988. pp. B-139 and B-140.*

* cited by examiner

LASER SINTERED TITANIUM ALLOY AND DIRECT METAL FABRICATION METHOD OF MAKING THE SAME

TECHNICAL FIELD

The present disclosure generally relates to titanium alloys and methods of making the same, and more particularly relates to the direct fabrication of parts from titanium alloys.

BACKGROUND

Three-dimensional parts are typically machined using a molded block of material as a starting point. Casting the block of material is a relatively cost efficient and accurate process, although forming the final part using post-casting machining and retooling processes can be long and expensive.

A more sophisticated method for manufacturing parts is commonly called rapid prototyping. Rapid prototyping involves producing computer models of a three-dimensional object and corresponding two-dimensional cross sections of the object. The models are stored in a memory as a computer aided design (CAD) file. The computer transmits signals from the memory to manufacturing equipment that responds to the signals and builds layer-by-layer until the three-dimensional object is produced. Building by adding material where it is needed instead of removing material where it is not needed is an efficient process that eliminates the need for retooling and post-mold machining. Further, rapid prototyping is capable of producing complex structures. However, rapid prototyping has typically been used to produce plastic parts, and there are few techniques for successfully manufacturing parts incorporating metals.

One rapid prototyping process uses selective laser sintering (SLS) for locally melting, solidifying and adhering polymers that form the three-dimensional object, both in an intralayer and an interlayer sense. An SLS process uses a laser to sinter a powder and form a coherent mass therefrom. Rockwell Scientific Company and Boeing-Rocketdyne have successfully developed methods that incorporate SLS processes for fabrication of nickel-based alloys and iron-based alloys, and these methods are disclosed in U.S. Pat. Nos. 5,932,055 and 5,745,834. The methods are known as direct metal fabrication (DMF) methods and include two-steps. First, a green part is formed using an SLS process to selectively sinter polymer binders and thereby bind a powdered metal alloy. After the so-called green part is formed, it is furnace treated to remove the polymer binders and to liquid phase sinter the powder metal part to full density.

During the SLS stage of the DMF method the polymer binder includes nylon 12 and bismaleimide (BMI), and a melting temperature depressant such as boron is utilized during the latter liquid phase sintering step. Although these binders are effective for binding some metal powders, they are unable to effectively bind powdered build material containing titanium or titanium alloys. Polymer binders leave a significant carbon residue that causes titanium parts to be brittle, and consequently ineffective. Also, boron does not have the desired eutectic behavior for enhancing the liquid phase sintering step with titanium alloys.

Other methods for building titanium alloy parts directly from a CAD file using powdered build material utilizes direct laser deposition technology such as laser engineered net shaping (LENS by Optomec®) and laser forming (Aeromet®). However, neither method is able to build intricate, discontinuous surfaces such as net shaped structures on the parts. Also, internal cavities and channels are virtually impossible to form due to lack of support during the building process.

Accordingly, it is desirable to provide a method for fabricating parts made of titanium or titanium alloys. In addition, it is desirable to provide such a method that is inexpensive and efficient. Furthermore, other desirable features and characteristics of the present disclosure will become apparent from the subsequent detailed description and the appended claims, taken in conjunction with the accompanying drawings and the foregoing technical field and background.

BRIEF SUMMARY

A powder blend is provided for forming metallic parts in a layer-by-layer technique with each layer of the metallic parts being formed in accordance with a CAD file. The powder blend comprises a titanium base metal or an alloy thereof, and an alloying metal having a lower melting temperature than that of the base metal or alloy thereof.

A method is provided for selective sintering a powder. The method comprises the first steps of spreading a layer of a powder blend on a platform, the powder blend including a titanium base metal or an alloy thereof, and an alloying metal having a lower melting temperature than that of the base metal or alloy thereof. Next, an energy beam is directed onto selected areas of the powder blend layer to thereby melt the alloying metal. Then, the alloying metal is re-solidified by withdrawing the energy beam from the powder blend layer to thereby bind the base metal or alloy thereof with the alloying metal.

A method is also provided for fabricating a metal part. The first part of the method includes the above steps for selective sintering a powder. Then, a preform part is built up by iteratively performing the spreading, melting, and re-solidifying steps recited above on additional adjacently formed powder blend layers. Afterward, a metal liquid phase sintering process is performed to form the metal part from said preform part. The metal liquid phase sintering step is performed at a temperature sufficient to melt the alloying metal but not the base metal or alloy thereof.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
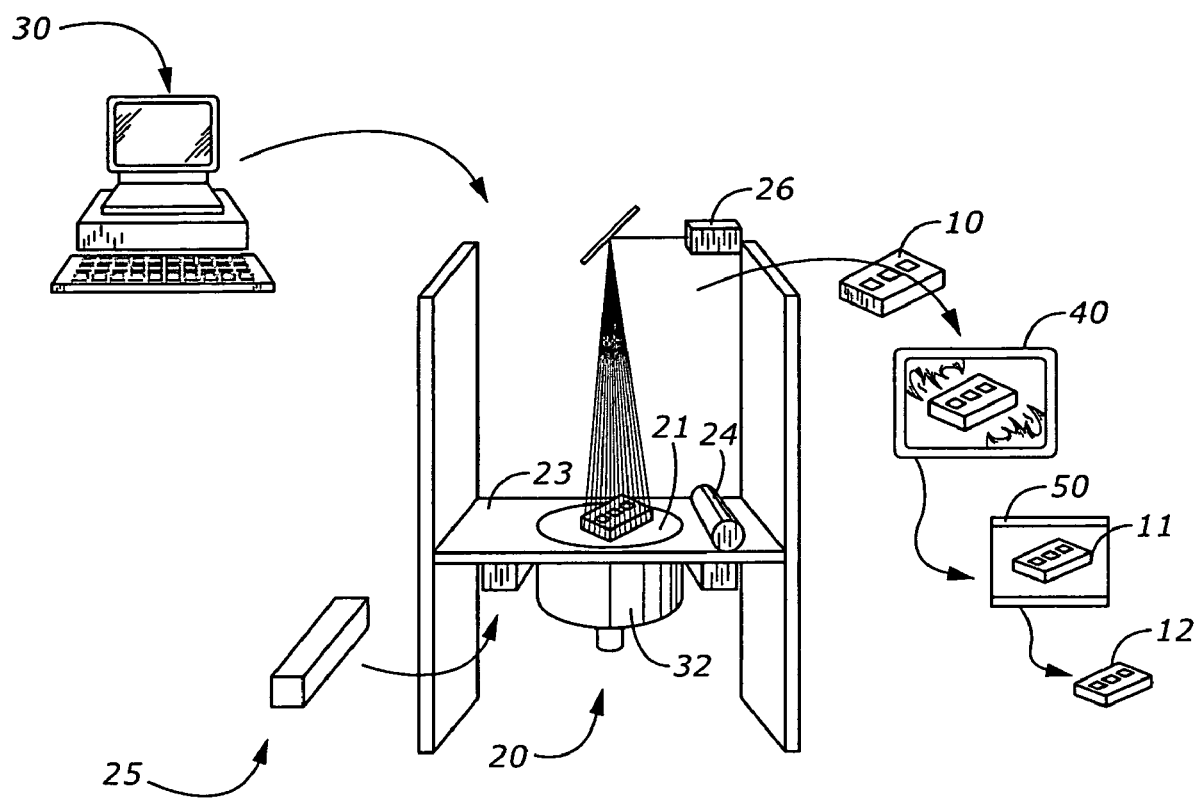
FIG. 1 is a schematic illustration of the SLS process and liquid metal sintering process for forming a metal part according to an embodiment of the disclosure.

The following detailed description is merely exemplary in nature and is not intended to limit the invention or the application and uses of the disclosure. Furthermore, there is no intention to be bound by any expressed or implied theory presented in the preceding technical field, background, brief summary or the following detailed description.

The present disclosure includes a DMF method for forming parts made from titanium or titanium alloys. The DMF process illustrated in FIG. 1 uses an SLS apparatus 20 to fabricate a preform part, hereinafter referred to as a green part 10. The SLS machine 20 includes a working surface 23 that includes a platform 21 on which a green part is formed layer-by-layer from a metal powder 25. The platform 21 may be constructed to descend into a cavity 22 as incremental layers of powder 25 are applied onto previously formed layers. The individual powder layers may be applied using a roller 24 or other known means for applying a uniform powder layer. The cavity 22 may be heated using coils or other heating means to maintain the powder 25 at a uniform temperature. Each powder layer is typically less than about 0.050 inch, and is preferably between about 0.010 inch and 0.020 inch. After each layer of powder 25 is applied onto the platform 21, a laser 26 is used to selectively melt an alloying component in the powder 25 in accordance with three-dimensional CAD data supplied by a computer processor 30. The melted alloying component interdiffuses with the surrounding metal powder and re-solidifies, causing the metal particles to be held together to form a green part layer. The metal particles in the layer are also joined to previously formed layers of the green part 10 as a result of the reaction with the alloying component. Layer formation as described above is repeated iteratively until the green part 10 is completely formed.

The powder 25 used for the SLS procedure includes titanium or a titanium alloy as a primary structural metal for forming the green part 10. In a preferred embodiment, the structural metal is titanium with about 5 wt. % aluminum.

According to an exemplary embodiment of the disclosure, the alloying component in the powder 25 includes a titanium-copper-nickel alloy that is blended with the structural metal. An exemplary titanium-copper-nickel alloy includes between about 12 wt. % and about 17 wt. % copper, and between about 12 wt. % and about 17 wt. % nickel, with the balance essentially being titanium. A preferred embodiment includes about 15 wt. % copper and about 15 wt. % nickel with the balance essentially being titanium. This alloy (Ti—Cu—Ni) is included in the powder 25 having a particle size of −240 mesh in an exemplary embodiment of the invention, and preferably −325 mesh. The Ti—Cu—Ni alloy melts at about 1700° F., which is much lower than the melting point for elemental titanium (about 3020° F.). Consequently, the laser selectively heats precise, localized portions of the powder 25 to a temperature of at least 1700° F. during the sintering procedure. The laser scans the powder 25 as directed by the computer processor 30 in accordance with three-dimensional CAD data. The laser may be emitted in the infrared or near infrared ranges, although any focused beam of energy, such as an electron beam, that is sufficiently intense to generate precise, localized heating may be used. The alloying component rapidly melts, and then rapidly re-solidifies to bind the titanium or titanium alloy constituents of the powder with connecting necks or bridges between metal particles. The green part 10 has a density that is between about 60% and about 70% of the final part density.

According to another exemplary embodiment of the disclosure, the powder 25 further includes elemental tin. Tin has a melting point about 449° F., which is about the same as the nylon 12 binder used in the prior DMF method described as part of the background of the present invention. Consequently, the SLS step of the embodiment utilizing tin as the alloying component is effectively similar to that of the background DMF method. The laser selectively heats portions of the powder 25 to a temperature of only about 449° F. or slightly higher.

When the Ti—Cu—Ni is the alloying component during the SLS step, as set forth in the exemplary embodiment described above, the powder 25 includes the Ti—Cu—Ni at a concentration ranging between about 10 wt. % and about 30 wt. %, preferably about 20%. If elemental tin is added as the alloying component as in another exemplary embodiment described above, the powder 25 includes the tin at a concentration ranging between about 5 wt. % and about 15 wt. %, preferably about 10 wt. %, in addition to between about 10 wt. % and about 30 wt. % Ti—Cu—Ni. In either embodiment the balance of the powder 25 is essentially the structural metal, which is titanium or a titanium alloy in an exemplary embodiment of the invention, and preferably a titanium alloy including about 5 wt. % aluminum.

In either of the above embodiments, there is no need to include any polymer in the powder 25 as a binder for the green part. The binding action of the tin according to one embodiment, or the Ti—Cu—Ni alloy according to another embodiment, provides strength through the entire SLS process because the metal is not burned out as the green part is formed. There is no carbon, oxygen, or hydrogen residue in the part using metal alloying components, unlike the prior DMF method that employs residue-depositing carbon-based resin binders. The use of a metal alloying component as a "binder" overcomes the problem of carbon contamination that previously impeded building a green part from titanium or titanium alloys.

Upon completion of the SLS procedure, the green part 10 is removed from the apparatus 20 and excess powder is brushed off. Then a metal liquid phase sintering process is performed to produce a sintered part 11. Following either of the above exemplary embodiments of the invention, all or most of the Ti—Cu—Ni alloying component remains unhomogenized with the base Ti or Ti alloy following completion of the SLS process. During the metal liquid phase sintering process, the alloying component completely melts during a furnace heating step. The sintered part 11 may be disposed in a ceramic boat for the heating cycle. If the sintered part 11 is complexly shaped or requires support during metal liquid phase sintering, it may be packed in a powder inside a ceramic crucible. Examples of suitable support powders include ceramic powders such as yttria, zirconia, silicon nitride, and boron nitride, and metal powders having a ceramic surface coating such as nickel aluminide powder with a nitrided surface. The crucible and boron nitride powder create an evenly heated environment that also supports the sintered part 11 to prevent it from slumping.

The heating cycle during the metal liquid phase sintering process involves a temperature ramp carried out at a slow rate above 1700° F. During the slow ramp, the Ti—Cu—Ni melts and liquid phase sintering is initiated. Furthermore, the Ti—Cu—Ni liquid increases in volume as titanium and tin from the unhomogenized powder is dissolved in the metal liquid. The titanium dissolution and liquid metal expansion continues until the liquid becomes a eutectic composition. As titanium continues to dissolve in the metal liquid, the liquid composition becomes increasingly hyper-eutectic with a correspondingly rapidly increasing melting temperature. Consequently, the metal liquid eventually reaches a composition that is diluted with titanium and in which the liquid is isothermally solidified. Further increases in temperature cause the alloy composition to homogenize by solid state diffusion. The sintered part 11 is then cooled, preferably in the furnace.

To provide support during the metal liquid phase sintering process, a support powder may be used to surround the green part 10 as it is densified and transformed to the sintered part 11. The support powder should be an inert substance, and is an inert ceramic powder in an exemplary embodiment of the invention. An example of such an inert ceramic powder is yttria. The support powder may include fine, spherical particulates that easily flow, ensure uniform heating during densification, and provide continuous support for all regions of the green part 10 to prevent it from cracking or slumping under the force of gravity. The support powder should possess sufficient thermal conductivity to provide uniform heating, be non-reactive with the green part 10, and be non-agglomerating at the temperatures required for the metal liquid phase sintering process. Non-uniform heating can cause the green part 10 to crack due to unequal shrinkage as the part 10 densifies. Agglomeration can cause excess support powder to become trapped in cavities and cause the part 10 to experience stress-induced cracking.

Following the metal liquid phase sintering process, the sintered part 11 may need to be further densified. If further densification is necessary, the sintered part 11 may be pressurized in a hot isostatic press (HIP). In addition to further densifying the sintered part 11, pressurization using the HIP causes copper and nickel from the Ti—Cu—Ni alloying component to be distributed substantially uniformly through the final part 12, and causes the final part 12 to have a substantially homogenous structure. In an exemplary embodiment of the invention, a densification process involving the HIP is carried out at about 1800° F. in an inert (e.g., Ar) environment at about 1500 psi for about four hours. The final titanium part 12 is densified approximately an additional 2% as a result of the densification process. Using the metal alloying component(s) in the SLS and liquid metal phase sintering processes of the present invention, the final part 12 may be formed as an intricate structure with complex surfaces, cavities, and channels from a CAD file.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for selective sintering a powder, the method comprising:
   spreading a layer of a powder blend on a platform, said powder blend comprising:
      a base metal of titanium or alloy thereof, the base metal having a first melting temperature, and
      an alloying metal having a second melting temperature lower than said first melting temperature,
      wherein the base metal and alloying metal are selected, and quantitatively included in the powder blend, based on a characteristic of the base metal to dissolve in but not react with the alloying metal when the alloying metal is liquefied at an annealing temperature between the first and second melting temperatures, and wherein said powder blend does not include a carbon-based polymer;
   directing an energy beam onto a localized portion of the layer of the powder blend and thereby melting said alloying metal in the localized portion; and
   re-solidifying said alloying metal by withdrawing said energy beam from said powder blend layer, and thereby binding said base metal or alloy thereof with said alloying metal in a metallic mixture in the localized portion, wherein a green part is formed;
   thereafter brushing off excess powder from the green part;
   heating the green part at a temperature sufficient to melt said alloying metal and dissolve the base metal therein to form a hyper-eutectic liquid composition; and
   after the hyper-eutectic liquid composition is formed, cooling the hyper-eutectic liquid composition to form a sintered part.

2. The method according to claim 1, wherein said alloying metal comprises elemental tin.

3. The method according to claim 2, wherein said tin is included in said powder at a concentration ranging between about 5 wt.% and about 15 wt.%.

4. The method according to claim 2, wherein said step of directing an energy beam heats the localized portion to a temperature less than about 1700° F.

5. The method according to claim 2, wherein said step of directing an energy beam heats the localized portion to about 449° F.

6. The method according to claim 1, wherein said alloying metal comprises a Ti-Cu-Ni alloy at a concentration ranging between about 10 wt.% and about 30wt.% of the powder blend, said Ti-Cu-Ni alloy being about 15 wt.% Ni and about 15 wt.% Cu, with the balance being Ti.

7. The method according to claim 6, wherein said step of directing an energy beam heats the localized portion to about 1700° F.

8. A method for fabricating a metal part, comprising the steps of:
   spreading a spread layer of a powder blend, said powder blend comprising:
      a base metal of titanium or alloy thereof, and
      an alloying metal having a lower melting temperature than that of said base metal, wherein said powder blend does not include a carbon-based polymer;
   melting selected areas of said alloying metal by directing an energy beam onto a localized portion of the spread layer;
   re-solidifying said alloying metal, thereby binding said base metal or alloy thereof with said alloying metal in the localized portion, wherein a green part layer is formed;
   spreading a next layer of powder blend on top of the green part layer;
   building up a green part by iteratively performing said steps of melting, re-solidifying, and spreading;
   after completion of the green part, brushing off excess powder from the green part;
   heating the green part at a temperature sufficient to melt said alloying metal and dissolve the base metal therein to form a hyper-eutectic liquid composition; and
   continuing to heat the hyper-eutectic liquid composition until the hyper-eutectic liquid composition solidifies into a sintered part.

9. The method according to claim 8, wherein said alloying metal comprises elemental tin.

10. The method according to claim 9, wherein said tin is included in said powder at a concentration ranging between about 5 wt.% and about 15 wt.%.

11. The method according to claim 10, wherein directing an energy beam heats the localized portion to a temperature less than about 1700° F.

12. The method according to claim 10, wherein directing an energy beam heats the localized portion to about 449° F.

13. The method according to claim 8, wherein said alloying metal comprises a Ti-Cu-Ni alloy at a concentration ranging between about 10 wt.% and about 30wt.% of the powder blend, said Ti-Cu-Ni alloy being about 15 wt.% Ni and about 15 wt.% Cu, with the balance being Ti.

14. The method according to claim 13, wherein directing an energy beam heats the localized portion to about 1700° F.

15. The method according to claim 8, wherein each of said powder blend layer is between about 0.010 inch and 0.002 inch in thickness.

16. The method according to claim 8, further comprising:
cooling the sintered part;
thereafter pressurizing the sintered part in an isostatic press to cause the sintered part to have a substantially homogenous structure and to be densified.

17. The method according to claim 16, wherein the isostatic pressure process is performed at about 1800 ° F in an inert environment at about 1500 psi.

18. The method of claim 1 further comprising:
thereafter pressurizing the sintered part in an isostatic press to cause the sintered part to have a substantially homogenous structure and to be densified.

19. The method of claim 1 wherein the green part comprises a structure having at least one of a cavity and a channel.

20. The method of claim 1 wherein both the green part and the sintered part comprise a structure having at least one of a cavity and a channel.

21. The method of claim 8 wherein the green part comprises a structure having at least one of a cavity and a channel.

22. The method of claim 8 wherein both the green part and the sintered part comprise a structure having at least one of a cavity and a channel.

* * * * *